3,345,298
HYDROGEN EMBRITTLEMENT INHIBITION
Morton W. Leeds, Murray Hill, and George Davidowich, Bayonne, N.J., assignors, by mesne assignments, to Air Reduction Company, Incorporated, New York, N.Y., a corporation of New York
No Drawing. Filed Apr. 15, 1964, Ser. No. 360,103
2 Claims. (Cl. 252—146)

This invention relates to the prevention of hydrogen embrittlement in the treatment of ferrous metals with aqueous acidic solutions, and is more particularly concerned with the provision of an acidic aqueous solution inhibited against hydrogen embrittlement by reason of the inclusion in the solution of a hydrogen-embrittlement-inhibitor.

In the treatment of ferrous metals, i.e. iron, steel and other ferrous alloys, such as in metal cleaning operations, or in pickling operations, to remove rust, grease, scale, or other undesired surface materials or coatings from the metal, e.g. in aqueous sulfuric acid solutions, the problem of hydrogen embrittlement is encountered. As stated by Dr. Carl A. Zapffe in an article entitled, "The Behavior of Hydrogen in Steel During Pickling" (Wire and Wire Products, February 1946, pages 149–157), hydrogen embrittlement of steel is a problem of long standing in plants using either acid or cathodic pickling, and hydrogen embrittlement as defined as the trapment under high pressure of hydrogen gas within the microscopic voids that traverse the interior of each grain of the metal. These voids, once congested sufficiently with the gas, place the grain under three dimensional stress, which precludes slip and plastic movement. The metal is then embrittled. As stated in the foregoing article, the tremendous quantity of hydrogen that steel may occlude within its microscopic voids is demonstrated by the pickling of a steel wire in sulfuric acid, followed by careful rinsing and drying, and subsequent immersion of the wire in deaerated hot water. The wire, upon immersion, produced a violent evolution, with the bubbling continuing visibly for 10 minutes.

It is customary in pickling, metal cleaning, and like operations to include in the aqueous sulfuric acid solution a corrosion inhibitor to prevent or retard attack by the acidic solution upon the metal being treated, and such corrosion inhibitors are commonly used in pickling and related metal treating operations. However, as discussed by Zapffe et al. in a series of three articles entitled "Evaluation of Pickling Inhibitors from the Standpoint of Hydrogen Embrittlement," which appeared at pages 933–939; 1048–1053, 1080–1082; and 1126–1130, 1172–1175; of "Wire and Wire Products," vol. 23 (1948), the great majority of compounds which act as corrosion inhibitors and are sold commercially for this purpose do not prevent hydrogen embrittlement and, indeed, actually promote and increase hydrogen embrittlement. In other words, the hydrogen embrittlement observed when these corrosion inhibitors are used is greater than that observed when the same metal is pickled under identical conditions in the raw sulfuric acid solution.

There is, therefore, an important need for hydrogen-embrittlement-inhibitors because the usual corrosion inhibitors cannot be relied on for this purpose.

It is, accordingly, an object of this invention to provide a hydrogen-embrittlement-inhibitor which is effective in aqueous sulfuric acid solutions to prevent hydrogen embrittlement of ferrous metals immersed in it.

It is a further object of the invention to provide an inhibited aqueous sulfuric acid solution suitable for the treatment of ferrous metals without hydrogen embrittlement.

It is a still further object of the invention to provide a method of preventing hydrogen embrittlement in the treatment of ferrous metals with aqueous sulfuric acid solutions.

These and other objects of the invention are achieved by the incorporation in an aqueous sulfuric acid solution of a small but effective hydrogen-embrittlement-inhibiting amount of a chlorinated acetylenic alcohol selected from the group consisting of 1-chloro-1-pentyn-3-ol and 1-chloro-1-hexyn-3-ol. The introduction of the chlorinated acetylenic alcohol in aqueous sulfuric acid solutions has been found to have the desirable result of inhibiting or substantially preventing hydrogen embrittlement of ferrous metals immersed in the solutions.

The use of these specific chlorinated acetylenic alcohols as hydrogen-embrittlement-inhibitors in aqueous sulfuric acid solutions is advantageous in that their inhibiting action is effective over a wide and useful concentration range. These inhibitors have the further advantage that they are effective even at very low concentrations in the acidic solutions. A further advantage of these inhibitors is that they may be used at elevated temperatures to provide good hydrogen-embrittlement-inhibition and even under these conditions they are effective in very low concentrations. The chlorinated acetylenic alcohols of this invention can be prepared from the corresponding acetylenic alcohols by the chlorination process described in Russell et al. U.S. Patent 2,989,568 of June 20, 1961.

The most effective amount of 1-chloro-1-pentyn-3-ol or 1-chloro-1-hexyn-3-ol to be used in accordance with this invention can vary, depending upon local operating conditions. Thus, the temperature and other characteristics of the aqueous acid system may have a bearing upon the amount of inhibitors to be used.

In general, however, it has been found that a concentration of 1-chloro-1-pentyn-3-ol or 1-chloro-1-hexyn-3-ol between 0.01% to 0.5% by weight of the aqueous sulfuric acid solution is an effective hydrogen-embrittlement-inhibiting concentration, with a concentration between 0.01% to 0.1% being particularly advantageous even for aqueous sulfuric acid systems at elevated temperatures, e.g. in the neighborhood of 80° C. The sulfuric acid solution can be dilute or concentrated and can be of any of the concentrations used in treating ferrous metals, e.g. 5 to 80%.

The following specific examples are illustrative of the corrosion inhibiting properties of the chlorinated acetylenic alcohols of the invention. In the examples, the inhibitor concentration is expressed as a percent by weight of the aqueous sulfuric acid solution in which it is incorporated. The method used to determine the hydrogen-embrittlement-inhibiting properties of the inhibitors of the invention as set forth in the following examples is that developed by Zapffe (Transactions American Institute of Metallurgical Engineers, Iron and Steel Div., vol. 167, pp. 281–282; 1946) which depends upon the breaking of a piece of wire which is bent around a constant radius through 180° at a constant rate. The rate of bending is 4.5° per second, which is rapid enough to prevent significant recovery from escaping hydrogen during bending, but not too rapid to allow reading of the breaking angle.

Wire specimens 4 in. long cut from Arcrod No. 1 stainless steel 430 welding wire (1/16 in. diameter) were used in the tests. The specimens were cleaned with 400 S emery cloth. The clean specimens in duplicate were placed in a jaw which contained 100 ml. of 4.8 N sulfuric acid, plus the inhibitor. The jars were placed in a constant temperature oven and heated for 15 min. at 80° C. The specimens were then removed, rinsed in water, dried, and the angle of bend determined. The bend angle indicated in the table below is an average of at least four specimens.

Example 1

The following test results illustrate the hydrogen-embrittlement-inhibiting properties of 1-chloro-1-pentyn-3-ol. Using the procedures described above, stainless steel wire specimens were immersed in 4.8 N sulfuric acid at 80° C. (176° F.) for 15 minutes with the inhibitor concentration being 0.05% and 0.01% of the acidic solution.

| Inhibitor concentration: | Bend angle |
|---|---|
| 0.05% | No breaking at maximum angle. |
| 0.01% | Do. |
| None (control) | Broke at 45°. |

Example 2

Using the procedure described above, 1-chloro-1-hexyn-3-ol was tested for its hydrogen-embrittlement-inhibiting characteristics. The inhibitor concentrations were those employed in Example 1.

| Inhibitor concentration: | Bend angle |
|---|---|
| 0.05% | No breaking at maximum angle. |
| 0.01% | Do. |

A particularly advantageous characteristic of 1-chloro-1-pentyn-3-ol and 1-chloro-1-hexyn-3-ol is that these two specific chlorinated acetylenic alcohols not only are outstanding inhibitors of hydrogen embrittlement in aqueous sulfuric acid solutions such as those used in pickling, but they also function as highly effective corrosion inhibitors in such solutions. In other words, these two specific chlorinated acetylenic alcohols have been found to be highly effective hydrogen-embrittlement-inhibitors which also function simultaneously as corrosion inhibitors and thus avoid the need for using both corrosion inhibitors and separate hydrogen-embrittlement-inhibitors in pickling or other metal treating operations with aqueous sulfuric acid solutions.

The corrosion inhibiting activity of 1-chloro-1-pentyn-3-ol and 1-chloro-1-hexyn-3-ol is demonstrated by the following examples. In the examples, the inhibitor concentration is expressed as percent by weight of the aqueous sulfuric acid solution in which it is incorporated and the acid concentration of the solution is expressed as percent by weight of the solution. The method used to determine the corrosion inhibiting properties of 1-chloro-1-pentyn-3-ol and 1-chloro-1-hexyn-3-ol as set forth in the following examples employed test specimens of low carbon 1020 cold-rolled steel. Coupons 3/4 in. x 1 1/4 in. were cut from the steel sheet-stock and pickled in dilute HCl to remove scale and surface film. After pickling they were dipped in sodium bicarbonate solution, rinsed well in tap water while rubbing with a piece of cotton, rinsed in distilled water and finally dried with acetone. The clean and dry specimens were then weighed to the nearest 0.1 mg., all handling being effected with forceps to keep the coupons free of oil or moisture from the hands. Each inhibitor was weighed and placed in 100 ml. of the acidic solution. Weighed and identified coupons in duplicate were supported on glass hooks in a 4 oz. glass jar, the solution being studied added, the jar covered and placed in a constant temperature oven at 80° C. for 3 hr. At the end of the exposure period, the jars were removed from the oven, samples removed, rinsed with tap water, sodium bicarbonate solution, tap water, distilled water and finally acetone. The dry coupons were weighed and the percent inhibition calculated by subtracting the loss in weight of the coupon from the original weight, dividing by the original weight and multiplying by 100. This is expressed by the following formula:

Percent inhibition $$= \frac{(\text{original weight specimen} - \text{weight loss}) \times 100}{\text{original weight specimen}}$$

The results are expressed as percent inhibition and are the average of the duplicate samples.

Example 3

Using the procedures described above, steel coupons were immersed at 80° C. (176° F.) for 3 hours in 4.8 N sulfuric acid containing 1-chloro-1-pentyn-3-ol in concentrations of 0.05% and 0.01% of the acidic solution.

| Inhibitor concentration, percent: | Immersion corrosion rate, percent |
|---|---|
| 0.05 | 99+ |
| 0.01 | 99+ |
| None (control) | 10 |

Example 4

Using the procedures described above, steel coupons were immersed at a temperature of 80° C. (175° F.) for 3 hours in a solution of 4.8 N sulfuric acid containing 1-chloro-1-hexyn-3-ol. The inhibitor concentrations were those employed in Example 1.

| Inhibitor concentration, percent: | Immersion corrosion rate, percent |
|---|---|
| 0.05 | 99+ |
| 0.01 | 99+ |

In order to demonstrate the unique activity, both with respect to the inhibition of hydrogen embrittlement and the inhibition of corrosion of ferrous metals in aqueous sulfuric acid of the two specific chlorinated acetylenic alcohols described above, the hydrogen embrittlement tests and the corrosion tests described in Examples 1 to 4 were repeated, under the identical conditions and with the same acid, but using 1-chloro-3-methyl-1-butyn-3-ol which is an isomer of 1-chloro-1-pentyn-3-ol of the invention. The results of these tests are set forth in the table below:

| Inhibitor Concentration, Percent | Bend Angle | Immersion Corrosion Rate |
|---|---|---|
| 0.05 | No breaking at maximum angle | 73 |
| 0.01 | Broke at 110° | 33 |

It will be understood that various changes and modifications may be made in the foregoing description without parting from the scope of the invention, as defined in the appended claims and it is intended, therefore, that all matter contained in the foregoing description shall be interpreted as illustrative only and not as limitative of the invention.

We claim:

1. A method of inhibiting hydrogen-embrittlement of ferrous metals by an aqueous sulfuric acid solution which comprises incorporating in said solution an effective inhibiting amount of a chlorinated acetylenic alcohol selected from the group consisting of 1-chloro-1-pentyn-3-ol and 1-chloro-1-hexyn-3-ol while said solution is in contact with said metals.

2. A method of inhibiting hydrogen-embrittlement of ferrous metals by an aqueous sulfuric acid solution which comprises incorporating in said solution 0.01 to 0.5% by weight of the solution of a chlorinated acetylenic alcohol selected from the group consisting of 1-chloro-1-pentyn-3-ol and 1-chloro-1-hexyn-3-ol while said solution is in contact with said metals.

References Cited

UNITED STATES PATENTS

| 1,796,839 | 3/1931 | Gravell et al. | 252—146 |
| 2,989,568 | 6/1961 | Russell et al. | 252—633 |
| 2,993,863 | 7/1961 | Monroe et al. | 252—147 |
| 3,114,657 | 12/1963 | Stilwell | 252—146 |

LEON D. ROSDOL, *Primary Examiner.*

W. E. SCHULZ, *Assistant Examiner.*